May 1, 1934.  L. C. IRWIN  1,956,577
TEMPERATURE OR PRESSURE CONTROLLER
Filed Sept. 26, 1931  3 Sheets-Sheet 1
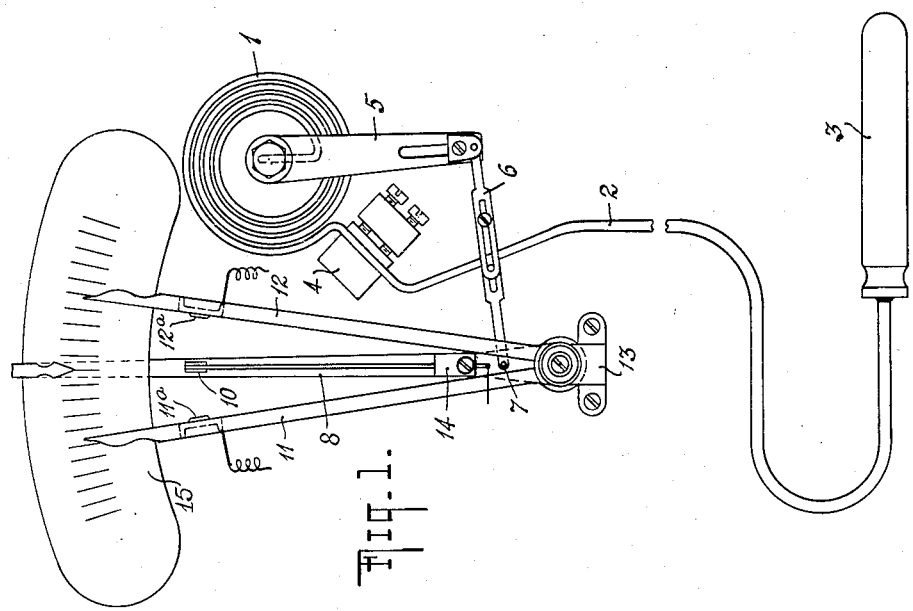
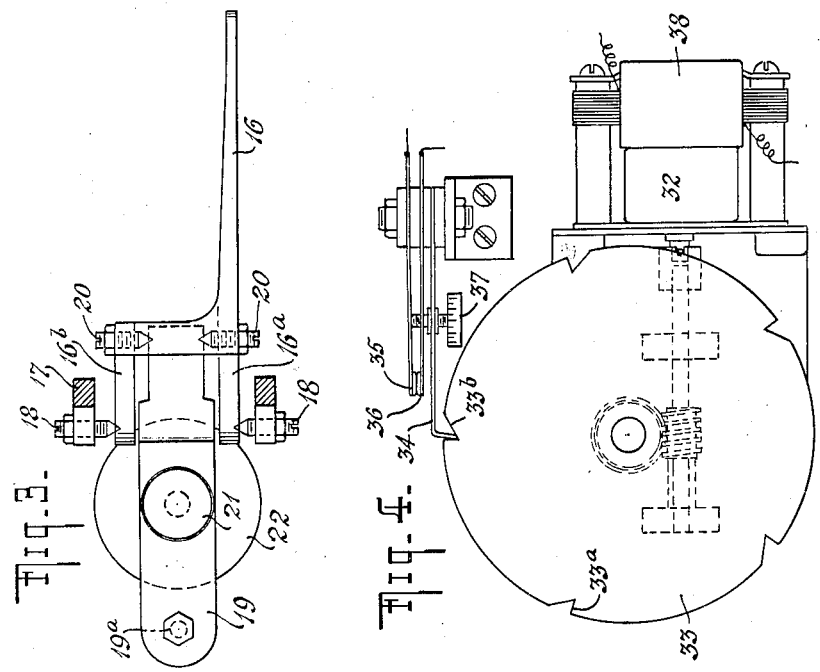
WITNESS
INVENTOR
LAWRENCE C. IRWIN
BY
ATTORNEYS.

May 1, 1934.                L. C. IRWIN                1,956,577
            TEMPERATURE OR PRESSURE CONTROLLER
                    Filed Sept. 26, 1931    3 Sheets-Sheet 2
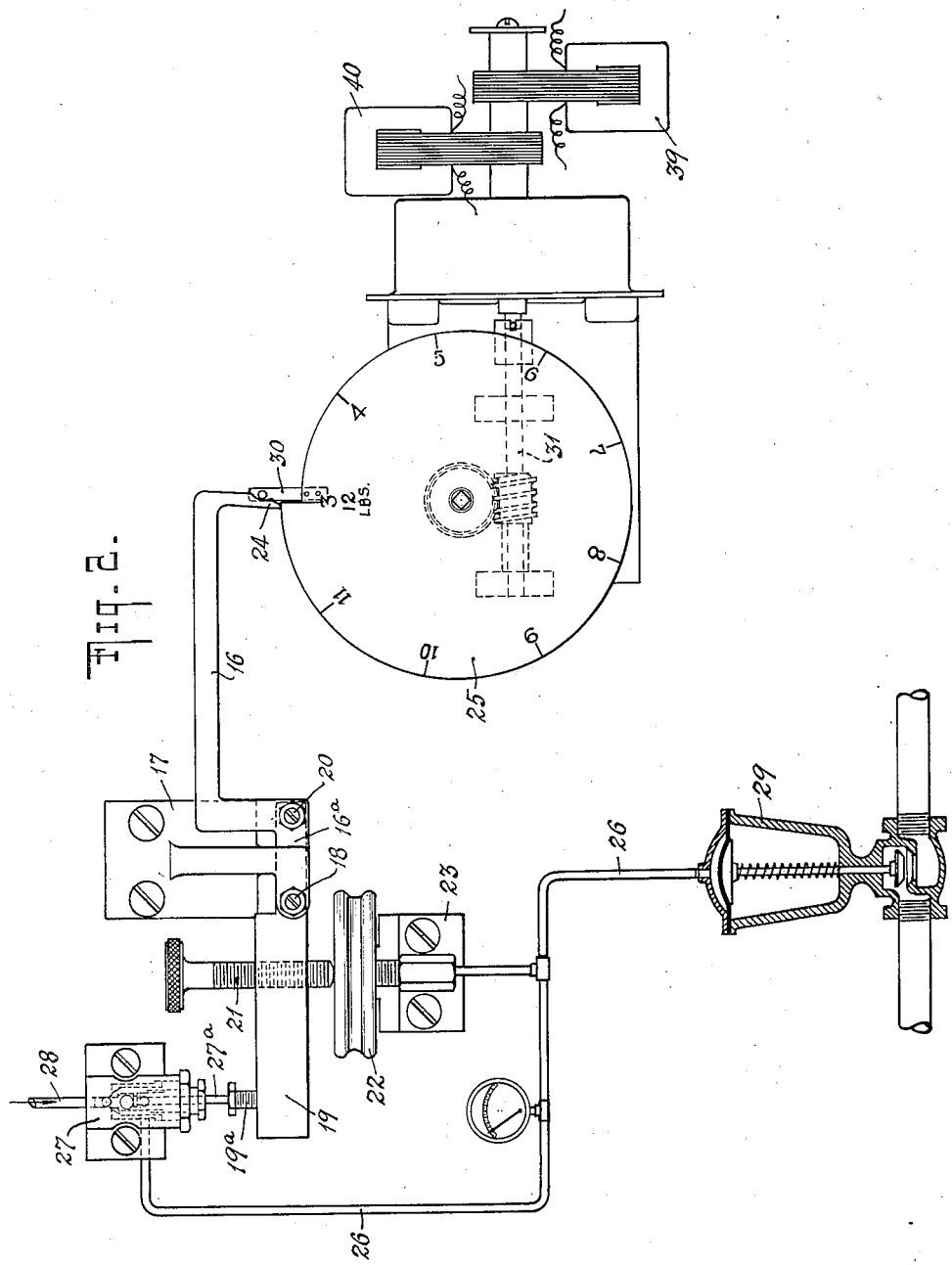
WITNESS                                      INVENTOR
                                        LAWRENCE C. IRWIN
                                          BY
                                              ATTORNEYS May 1, 1934.  L. C. IRWIN  1,956,577
TEMPERATURE OR PRESSURE CONTROLLER
Filed Sept. 26, 1931  3 Sheets-Sheet 3
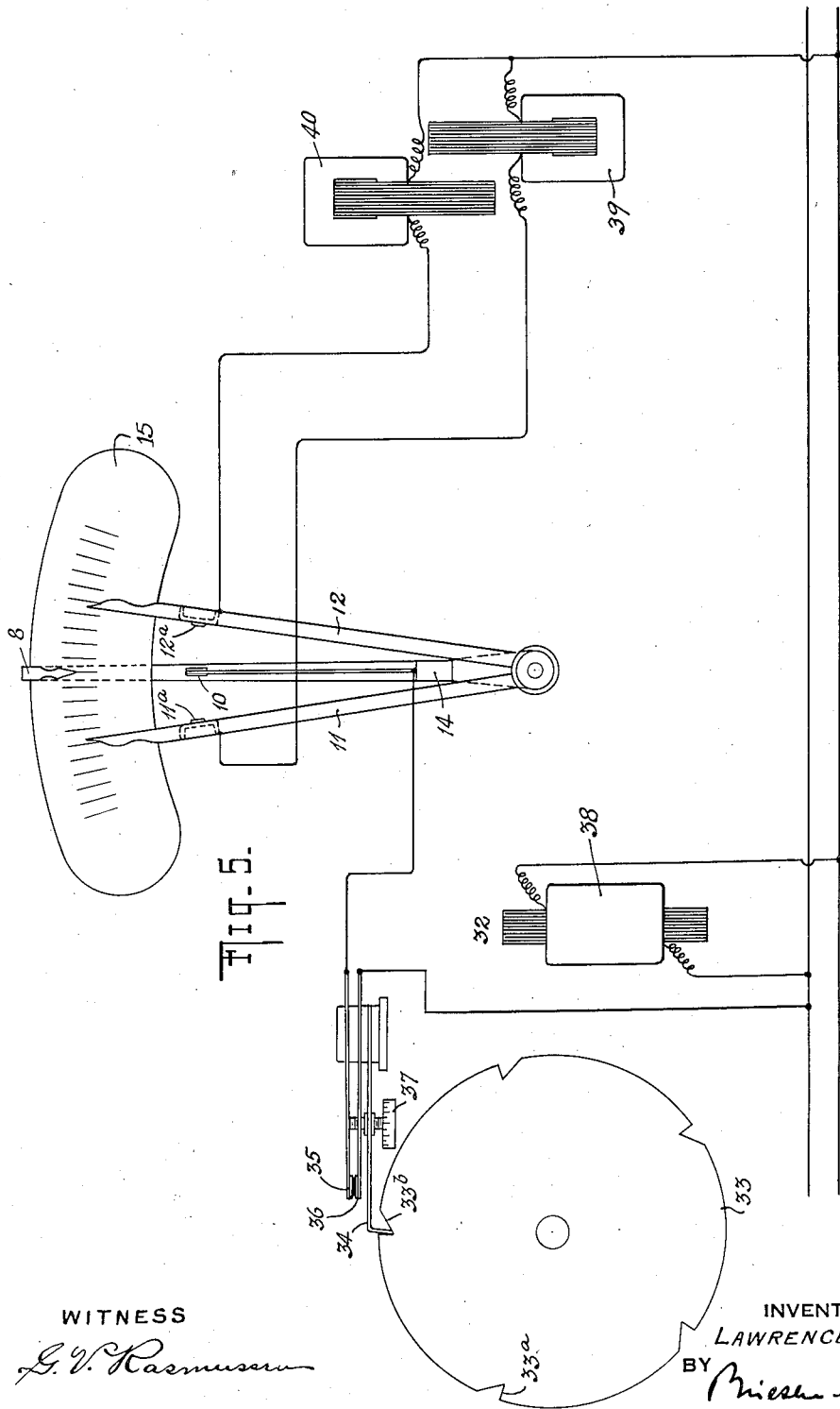
WITNESS
G. V. Rasmussen
INVENTOR
LAWRENCE C. IRWIN
BY
ATTORNEYS Patented May 1, 1934

1,956,577

UNITED STATES PATENT OFFICE 1,956,577

TEMPERATURE OR PRESSURE CONTROLLER

Lawrence C. Irwin, Brooklyn, N. Y., assignor to Charles J. Tagliabue Mfg. Co., Brooklyn, N. Y., a corporation of New York Application September 26, 1931, Serial No. 565,396

32 Claims. (Cl. 236—84)

The present invention relates to mechanism for maintaining the temperature or pressure within an apparatus between predetermined limits, and in particular to an apparatus of this kind wherein electric circuits are controlled by fluctuations in such temperature or pressure to effect regulation of a control or feed valve to restore the temperature or pressure to a value within said limits.

In the known types of electrically operated valves, such as steam valves, employed for controlling the supply of a fluid to an apparatus and operated by a solenoid in such a manner that upon the automatic closing of a circuit when a predetermined temperature or pressure limit in the apparatus is reached, the solenoid is energized through a relay, the control or steam valve is either completely closed or completely opened. The same is generally true of valves operated by electric motors. When, for example, in known arrangements the temperature in a steam heated apparatus falls to the predetermined low limit, a movable contact arm engages a low temperature contact and closes a circuit through which the solenoid or motor is energized and the steam valve is opened wide; the temperature then rapidly rises until the movable contact arm engages the high temperature contact, whereupon a second circuit is closed through which the steam valve is completely closed. This complete and rapid opening and closing of the control valve cause wide fluctuations in the temperature (or, in the case of pressure control, of the pressure), the curve of the recorder chart zigzagging between the upper and lower limits, which in many industrial operations is highly undesirable.

With many known types of air-operated control valves, such as steam valves, employed for controlling the supply of a fluid to an apparatus and usually operated by an air relay commonly known as a pilot valve, successful control, that is, control with a minimum of rapid oscillation and with freedom from hunting, is accomplished only when there is a relatively quick response of the temperature or pressure sensitive element to a change in the control valve, that is, when the controlled apparatus is relatively free from thermometric lag. In the presence of considerable lag, on the other hand, these known types will fail to hold the temperature between chosen narrow limits because, once an initial disturbance has started the valve closing or opening movement, this movement persists until the sensitive element has deterred the corrective change, by which time the valve has changed much more than enough to correct for the disturbance. This is the case, at least, when the controller has been adjusted to take care of expected large disturbances. If the controller is not so adjusted, it will fail to restore the temperature or pressure when the disturbance is large and is at all prolonged. In the worst cases the control valve will be completely closed and then completely opened in alternation as rapidly as the lag of the apparatus permits.

It is accordingly an object of the present invention to provide a temperature or pressure controller whereby the degree of opening and closing of the control valve is regulated in such a manner that rapid fluctuations in the feed of the heated or pressure fluid, and hence in the physical conditions in the the apparatus being controlled, are avoided.

The present invention thus aims to provide a controller in which the restoring action is made sufficiently sluggish to fit the natural lag of the apparatus, and in which, at the same time, the temperature or pressure responsive element can be made as sensitive and quick acting as is desired. With this end in view I employ, with the air operated control valve, a sensitive temperature or pressure responsive device which includes control limit determining means, such as an electric contact mechanism, to regulate the opening and closing of the control valve with a speed adjusted to fit the lag of the apparatus. By such means the control valve can reach an intermediate position between the chosen limits and remain there steadily throttling the flow through it, without exhibiting a tendency to overstep or "hunt" beyond these limits.

I may also employ an interrupter device in association with my improved control mechanism, whereby the conditions in the apparatus under control may be automatically ascertained or sensed periodically and suitable adjustment of the control valve effected. With the aid of such interrupter, the control valve can be made to move in relatively quick short steps, allowing time between steps for the change to be fully detected by the sensitive responsive element, instead of the movement being slow and continuous and hence still persisting when the correct temperature or pressure is reached. Such interrupter mechanism is of especial advantage where the temperature or pressure in the controlled apparatus changes only slowly; the interrupter may thus be made to effect adjustment of the control valve for only a small degree at a time, a suitable time interval then being permitted to elapse to enable the results of the new adjustment to manifest themselves. If at the end of such interval a circuit is still closed through the high or low contact, the control valve is further adjusted and a similar time interval allowed to elapse, and such stepwise adjustment continued until that position of the control valve is reached at which the temperature or pressure is between the predetermined limits. By such means the recovery from a disturbance may be quicker than without the interrupter and overstepping of the control range in either direction avoided.

My invention also contemplates the provision of a mechanism of the type indicated which is characterized by extraordinary sensitivity, the same being capable, for example, of maintaining the temperature in an apparatus within limits that are only a very few degrees apart.

It has hitherto been the practice in the design of apparatus which includes an air-operated control valve or servo-motor, to open the valve to the greatest extent that it could be moved when the maximum amount of flow was desired, although such complete opening was unnecessary to obtain the maximum flow, as such flow could be secured at an intermediate adjustment of the valve. Similarly, it has been the practice to apply much more air pressure than was necessary to effect the closing of the valve. I have found after long investigation and experimentation that such procedure is responsible in large part for the failure in many instances to obtain a straight line temperature or pressure control. I have found that the opening of the valve beyond the intermediate point at which the maximum flow through the air-operated control valve is obtained, and the use of a pressure in excess of that necessary to close the valve, produce a time lag due to the fact that additional time must be allowed for moving a completely retracted valve to the initial position of maximum flow when the valve is to be closed, and for charging or discharging the excess quantity of air from the air chamber of the valve when the latter is to be opened. Particularly in the control of apparatus in which the temperature or pressure varied rapidly, this time lag was sufficient to cause considerable variations in the temperature or pressure in the apparatus before the control mechanism became effective to bring the temperature or pressure to a value between the predetermined upper and lower limits.

The present invention provides a mechanism in which this time lag is substantially eliminated so that a highly sensitive and quickly responsive instrument is obtained. I accomplish such result by determining the characteristics of the control valve, i. e. the air pressures at which the valve reaches that intermediate position at which the flow is a maximum (beyond which position of the valve the flow remains substantially constant), and the pressure at which the valve just closes, i. e. the pressure which is just sufficient to close the valve (a very slight excess pressure being preferably employed to allow for fluctuations in the pressure of the air supply). The mechanism which controls the supply of air to the valve is then calibrated in correspondence with these characteristics in such a manner that the valve is not retracted for any substantial distance beyond its position of maximum flow, while no considerable excess of pressure beyond that necessary to close the valve is employed.

It has also been the practice in air-operated control mechanism to control the supply of air to the diaphragm of a control valve or of a servomotor through a pilot valve in association with an expansible member, such as a capsular spring, which is under the influence of the temperature or pressure in the apparatus being controlled, as by being connected with a thermostatic bulb or with mechanism which places such member under the pressure prevailing in the apparatus. In this type of instrument changes in the pressure of the air supply are apt to disturb the control mechanism, as such mechanism is ordinarily adjusted for use with an air supply at a definite pressure.

In accordance with a further development of the present invention, I provide means whereby fluctuations in the air supply pressure from a selected value are automatically compensated, so that they have no influence upon the control operations. The controller is thus compelled to function only according to changes in the temperature or pressure in the apparatus being controlled, and further, a given setting of the mechanism which immediately controls the air on the control valve, for example, a cam, always produces the same pressure on the control valve independently of the air supply pressure, with an accuracy sufficiently high as to be characterized as exact. This does not mean that there is exact correspondence between the positions of the control valve and of the temperature or pressure responsive element. On the contrary, the control valve may take up any position whatever according to the demand of the apparatus, while the movable member of the sensitive element remains between the closely chosen limits.

Other objects of the invention will be apparent from the following description and the features of novelty will be set forth in the appended claims.

The accompanying drawings illustrate by way of example a preferred embodiment of the invention. In said drawings, Fig. 1 is a diagrammatic view illustrating a typical form of electric contact thermo-sensitive mechanism;

Fig. 2 illustrates the mechanism associated with the mechanism shown in Fig. 1 for controlling the pilot air valve in accordance with the present invention;

Fig. 3 is a plan view of the lever mechanism shown in Fig. 2;

Fig. 4 illustrates an interrupter driven by a Warren motor; and

Fig. 5 shows a schematic wiring diagram.

A suitable form of temperature-responsive electric contact mechanism for use in connection with the present invention is shown in Fig. 1 and comprises an expansible Bourdon spring 1 of known construction which is connected by a capillary tube 2 with a bulb 3 containing an expansible fluid and adapted to be located at the place or in the apparatus whose temperature is to be controlled. It will be understood that the spring 1 or equivalent mechanism may be connected with an element or instrument which is under the influence of the pressure prevailing at any given place or apparatus whose pressure is to be controlled, or directly with the interior of such apparatus to respond to pressure changes therein; and where in the following description I speak of a temperature-responsive element or of temperature control, it is to be understood that I include thereby a pressure responsive element or pressure control as equivalents.

The outer end of the Bourdon spring 1 is rigidly held in fixed position by means of a clamp 4 associated with the casing of the instrument. To the inner movable end of the spring is fixed a lever 5 whose other end is connected to an adjustable link 6 pivoted at 7 to an oscillating lever or pointer 8 mounted upon a bracket 13 secured to the casing of the instrument. The lever 8 carries a neutral contact 10 which is insulated from the lever by an insulating block 14. Adjustable pointer arms 11 and 12 are mounted co-axially with the lever 8 and are frictionally held in adjusted position upon the bracket 13. The arms 11 and 12 are provided with low temperature and high temperature contacts 11a and 12a respectively, which can be adjusted to any predetermined distance apart by suitably shifting the arms 11 and 12 whose upper pointed ends cooperate with a fixed scale 15, as also does the lever 8.

In the operation of the mechanism above described, the bulb 3 is placed in the apparatus whose temperature (or pressure) is to be controlled. Upon the rise and fall of the temperature (or pressure) in such apparatus, the spring 1 will expand and contract to a proportionate degree, the lever 8 being thereby oscillated toward the contact 12a or 11a, which it engages when the temperature (or pressure) reaches the predetermined maximum or the predetermined minimum. Upon the engagement of the contact 10 with either contacts 11a or 12a, electric circuits are closed which effect the control operations to be described hereinbelow.

Fig. 2 shows my improved mechanism for controlling the supply of air to an air-operated servo-motor, such as a diaphragm control valve, whereby the latter is suitably adjusted or throttled to feed only so much heating medium, such as steam, as will maintain the temperature in the apparatus being controlled within the limits predetermined by the setting of the arms 11 and 12, shown in Fig. 1. The control mechanism includes a lever 16 which is pivotally supported on a fixed bracket 17 as shown at 18. As illustrated in Fig. 3, the left-hand end of the lever 16 is bifurcated, the two furcations being indicated at 16a and 16b. A lever 19 is pivoted between the furcations by means of screws 20 passing through the latter and provided with pointed ends which bear against such lever. A screw 21 passes through a threaded opening in the lever 19 and engages a capsular spring 22 supported upon a bracket 23, the lever 19 pivoting on the lower end of screw 21. The other end of the lever 16 is provided with a rider 24 which engages a reversibly rotatable cam 25 which will be described more fully below.

The outer end of lever 19 supports an adjustable screw 19a which cooperates with the vertically movable stem 27a of a direct acting pilot valve 27 of known construction provided with a ball which controls the communication between the air supply pipe 28 and the line 26 leading to the air chamber of a servo-motor 29, shown in the form of a feed control valve. Upon rise of the screw 19a, as a result either of fall of the rider 24 or of expansion of capsule 22, or of both, the ball is lifted to close either partially or completely the pipe 28 and at the same time expose the enlarged bore in which the stem 27a slides and thus effect partial or complete discharge of the air through such enlarged bore, thereby reducing the pressure on the diaphragm of valve 29 and permitting the valve to open under the action of its spring. Upon fall of the screw 19a, when the reverse conditions exist, the ball moves toward the position in which it closes the bore in which the stem 27a slides; air from pipe 28 then has greater access to the line 26, so that the air pressure on the diaphragm of the valve 29 increases and such valve is adjusted toward the closed position.

The cam 25 is provided with a stop 30 which arrests rotation of the cam when either the highest or the lowest points on the cam come beneath the rider 24, the cam being provided with a friction clutch which permits the drive shaft 31 to continue rotating when the cam is held by the engagement of stop 30 and rider 24 against further rotation in the same direction. The motor which drives the cam is provided with two independent coils 39 and 40, whereby the armature may be rotated in opposite directions, as will be explained more fully below.

The interrupter shown in Fig. 4 is one of many forms that may be used to close electric contacts periodically for controlling circuits through the contacts 10, 11a and 12a. In the present arrangement such interrupter serves for periodically and automatically testing the temperature or pressure conditions at the place where the bulb 3 or equivalent device is located. The mechanism shown comprises a Warren motor 32 which continuously drives a cam 33 at a constant rate of speed, say one revolution for every five minutes. The cam 33 is notched at regular intervals, the notches being each defined by a substantially radial surface 33a and an inclined surface 33b. A flexible arm 34 cooperates with the cam 33 and is arranged to control the spring contacts 35 and 36 by means of an adjustable screw 37 which is threaded thereinto. The screw passes through a clearance hole in the contact 36 and is engageable with the contact 35. When the free end of arm 34 falls into a notch, the screw 37 likewise falls and permits contact 35 to engage contact 36. As the free end of arm 34 rides upon the inclined surface 33b on continued rotation of the cam 33, the screw 37 moves toward contact 35 and eventually moves it away from contact 36. By adjustment of the screw 37 the duration of the engagement of contacts 35 and 36 can be varied up to nearly the time interval required for the cam to traverse the angular distance corresponding to the length of the inclined surface 33b.

The interrupter mechanism shown in Fig. 4 may be dispensed with in certain arrangements, as in the case of pyrometer control where contact between the galvanometer pointer and a stationary contact bar or bars may be established periodically, for example, by means of a bail which overlies the pointer and is intermittently depressed to move the pointer toward the contact bars and make contact therewith when such pointer is beyond a predetermined position. Also, where the apparatus being controlled heats up rapidly, the interrupter mechanism may be omitted, as the control valve then responds quickly to the changes in the temperature conditions in the apparatus.

As shown on the wiring diagram in Fig. 5, the coil 38 of the Warren motor 32 is in constant connection with the source of current, so that the interrupter runs continuously. The contact 35 is connected with contact 10, and the contact 36 with one of the power lines, while contacts 11a and 12a are connected through coils 39 and 40 of the motor of cam 25 with the other power line. As already described, the contacts 35, 36 are closed periodically, and if at such instants of closing the contact 10 is in engagement with the low temperature contact 11a, the circuit is closed through the coil 39, whereupon the cam 25 is driven clockwise so that the rider 24 of the lever 16 rides toward the smaller radius of the cam and thereby falls with respect to the pivot 18. The screw 19a is thereupon raised, and by engagement with the stem 27a lifts the ball valve so as to expose the enlarged bore in which the stem slides. The air pressure in line 26 then falls and the diaphragm valve 29 opens under the tension of its spring to permit more steam or other heating medium to enter the apparatus. If, on the other hand, at the instant that the contacts 35 and 36 are closed, the neutral contact 10 is in engagement with the high temperature contact 12a, current passes through the coil 40, whereupon the cam 25 is rotated in a counterclockwise direction, causing the rider 24 to rise and the screw 19a, stem 27a and ball valve to fall. The pressure in line 26 thereupon increases and operates to move the diaphragm valve 29 toward the closed position against the action of its spring. Less heating or other medium is now fed to the apparatus under control. In the normal operation of the device, the valve 29 is for the greater part of the time held in such throttling position that only so much heating medium is admitted into the apparatus being controlled, as will keep the temperature therein within the limits determined by the positions of the arms 11 and 12.

The operation of my improved mechanism will be clear from the above description. When the instrument is set into action, the arms 11 and 12 are adjusted to the positions corresponding to the maximum and minimum temperatures between which the temperature in the apparatus is to be maintained. Upon fall of the temperature in such apparatus to or below the predetermined minimum, the neutral contact 10 engages the contact 11a and at the next engagement of the arm 34 (Fig. 4) in a notch in the cam 33, the circuit to the coil 39 is closed across the contacts 35 and 36, whereupon the cam 25 is rotated clockwise for a short distance to effect partial discharge into the atmosphere of the air admitted into the pilot valve 27 by the conduit 28. The pressure upon the diaphragm of the valve 29 is thereby reduced and the valve opens to a greater extent to admit more heating medium to the apparatus under control.

If, on the other hand, the temperature in the apparatus rises to or beyond the predetermined maximum, the neutral contact 10 engages the contact 12a and upon the closing of the contacts 35 and 36, the coil 40 is energized to effect counterclockwise rotation of the cam 25. The ball in the valve 27 thereupon falls to a greater or less extent, the pressure upon the diaphragm of valve 29 is increased, and the flow of the heating or other medium is throttled.

It will be apparent that by suitably adjusting the arms 11 and 12 the temperature in the apparatus can be maintained within very narrow limits.

In order, however, to insure sensitive operation of the mechanism and to enable the temperature (or pressure) to be maintained at a practically constant value within extraordinarily narrow limits, I have devised certain novel features for accomplishing such purpose. The first of these features concerns the construction of and relationship between the valve 29 and the cam 25. As heretofore constructed, the head of an air-operated control valve was made to accomplish a considerable degree of movement beyond the position at which the maximum flow through the valve is attained. Consequently, considerable time was consumed in returning the valve head from its extreme retracted position to the position beyond which the flow through the valve was throttled, so that a certain delay was experienced when the flow through the valve was to be throttled. Similarly, an excessive pressure, i. e. a pressure considerably in excess of that required just to close the valve, has heretofore been resorted to to effect closing of the valve. Consequently, before the valve was opened, an appreciable time interval was first consumed in relieving the excess air pressure before the valve began to open. Such known valves therefore failed to respond rapidly to conditions which required either throttling of the valve from its fully retracted or open position, or opening of the valve.

According to the present invention, greater sensitivity is attained and fluctuations of temperature avoided by cutting the cam 25 close to the characteristics of the valve 29. Thus, if the valve is opened by its spring to the position of maximum flow when the pressure upon the diaphragm falls to 3 lbs., then the lowest point on the cam is made to correspond to a pressure of 3 lbs. on such diaphragm. Again, if the valve just closes when the pressure on the diaphragm is 12 lbs., then the highest point on the cam is made to correspond to a pressure of 12 lbs. on the valve diaphragm. As a result, the head of the valve 29 according to the present invention performs no useless movement beyond the position at which maximum flow through the valve is attained, while the diaphragm and spring of the valve are not strained beyond the degree at which the valve just closes, so that upon rotation of the cam 25 in either direction from the "12 lbs." or "3 lbs." position thereof, a control effect is immediately transmitted to the valve 29 and the latter responds practically instantaneously to increase the throttling or opening of the valve. The limiting pressures may be made slightly higher than 12 lbs. and slightly lower than 3 lbs. to take care of fluctuations in the air pressure.

My improved mechanism is characterized also by practically complete independence of fluctuations in the pressure of the compressed air supply. This is accomplished by connecting the capsular spring 22 with the air line 26 leading to the diaphragm valve 29. In prior constructions of related nature, the capsular spring was connected to the temperature bulb or pressure chamber of the apparatus being controlled, and was responsive to variations in the physical condition in such apparatus; variations of pressure in the pneumatic line connected with the diaphragm valve, however, had no direct effect upon such capsular spring. Consequently, if the pressure of the air supply increased for any reason, an excessive pressure was imposed upon the diaphragm valve and the latter was immediately adjusted to a position which was not in correspondence with the position of the controller, so that the proper operation of the whole mechanism was disturbed. This was a serious disadvantage since a considerable period of time could elapse before this condition was corrected. In my improved construction, fluctuation in the pressure of the air supplied by pipe 28 from the fixed pressure for which the instrument is calibrated, resulting in variations of pressure in the line 26 from the pressures determined by the position of the cam 25, is corrected by the capsular spring 22; for upon rise of pressure in line 26, the spring 22 will expand to effect raising of the ball in valve 27, while upon fall of pressure in said line, the spring 22 will collapse and permit the ball to move toward its lower seat to throttle the escape of air into the atmosphere. The spring 22 thus acts to keep the pressure in line 26 at the values determined by the positions of the cam 25.

The time during which the contacts are kept closed by the interrupter and the speed of the cam 25 are preferably so selected that the cam moves for only a short distance at a time to effect a correspondingly small adjustment of valve 29. There is thus provided an interval between successive closings of the contacts 35, 36, during which the effect of the new position of the valve 29 can manifest itself in the apparatus under control. Upon the next closing of the contacts 35, 36, the cam is again moved for a short distance if the contact 10 still engages contact 11a or 12a, and the valve 29 is thus moved stepwise at regular intervals until the contact 10 moves to an inoperative position intermediate the contacts 11a and 12a. My improved mechanism thus increases or decreases by degrees the flow of treating fluid to an apparatus and automatically senses or tests the conditions in such apparatus after every small change in the feed. As a result the temperature or pressure is kept at a value between the predetermined limits, instead of being constantly moved from one limit to the other in alternation.

The screw 21 which is engaged by the capsular spring 22 is preferably so adjusted that when the "12 lbs." graduation on cam 25 is directly beneath the rider 24, the pressure in the line 26 is 12 lbs. The remainder of the cam is then so cut, as stated above, that at the successive graduations the corresponding pressures prevail in line 26. By adjusting screw 21, the pressure range of the cam 25 may be varied.

It will be noted that if the bulb 3 were connected with the spring 22, as in known constructions, rise of the temperature or pressure at the place under control would cause expansion of the spring 22 and opening of the valve 29 to feed more heating or pressure medium, which is the reverse of what should be accomplished.

Certain features of my invention may be used without others and variations from the specific embodiment of the invention described and illustrated may be resorted to within the scope of the appended claims without departing from the spirit of the invention. For example, my improved mechanism for adjusting a feed control valve to a throttling position intermediate its fully open and closed positions to maintain the temperature or pressure within an apparatus within predetermined limits, and the mechanism whereby said control valve is adjusted by increments until such intermediate position is reached, may be employed in association with other elements to control other physical conditions in an apparatus being controlled; for example, a device responsive to the humidity in an apparatus may be arranged to control electric circuits which in turn effect the regulation of the position of a feed member or valve in the manner hereinabove described.

I claim:

1. In a temperature or pressure controller, the combination of a pneumatically operated control valve, a source of compressed air therefor, a pilot valve for regulating the flow of air to said control valve, means for adjusting said pilot valve in response to temperature or pressure fluctuations at the controlled place including a cam, a lever mechanism associated with said cam and effective upon said pilot valve to adjust the same in correspondence with the position of the cam, said cam so formed that for every position thereof with respect to said lever mechanism there exists a definite pressure on said valve.

2. The combination as set forth in claim 1, including means for compensating for fluctuations in the pressure of the supplied air.

3. The combination as set forth in claim 1, including means for compensating for fluctuations in the pressure of the supplied air, said means comprising an expansible member connected with the air chamber of the control valve and associated with said lever mechanism to adjust the same independently of the cam.

4. In a temperature or pressure controller, the combination of a pneumatically operated control valve, a source of compressed air connected with said valve, a pilot valve for regulating the flow of air to said control valve to adjust the position thereof, a cam, a reversible motor for operating the same, a lever cooperating with said cam, a second lever pivoted to said first lever so as to be capable of movement independently of the latter and arranged to adjust said pilot valve, the different positions of the cam creating definite pressures upon the control valve, and means for compensating for fluctuations in the pressure of the supplied air to maintain the pressure on the valve at the value corresponding to the position of the cam, said means comprising an expansible member connected with the air chamber of the control valve and bearing against said second lever.

5. In a temperature or pressure controller, in combination, a pneumatically operated valve arranged to control the flow of a heating or pressure medium to an apparatus whose temperature or pressure is to be controlled, a pilot valve associated with such control valve and operable to regulate the flow of compressed air to the latter, cam and lever mechanism operative to adjust said pilot valve, and a capsular spring connected with the air conduit between the pilot and control valves and operatively associated with the lever mechanism to adjust the same in response to fluctuations in the pressure in said conduit to maintain the pressure in the latter at the value corresponding to the position of the cam.

6. The combination as set forth in claim 5, including a reversible motor for operating the cam, and electric circuits adapted to be closed when the temperature or pressure in the apparatus under control rises above a predetermined maximum or below a predetermined minimum, to effect rotation of said cam in the one or the other direction to regulate the pressure upon the control valve.

7. In a temperature or pressure controller, the combination of a pneumatically operated servo-motor arranged to control the feed of a fluid to an apparatus under control, a pilot valve provided with an inlet for connection with a source of compressed air, and associated with said servo-motor to control the pressure of the air therein, mechanism responsive to the temperature or pressure in the apparatus under control and including a movable member and means determining the control limits of the temperature or pressure in said apparatus, and regulating mechanism for said pilot valve including an element associated with said responsive mechanism and movable in opposite directions at a relatively slow progression as said member reaches one or the other of said determining means to effect slow incremental adjustment of said pilot valve.

8. The combination as set forth in claim 7, including an interrupter mechanism associated with the responsive mechanism and operative to cause actuation of the regulating mechanism only intermittently when one or the other of the control limits has been reached.

9. The combination as set forth in claim 7, wherein said servo-motor comprises a control valve, and wherein said regulating mechanism is so constructed that in one limiting position thereof the pilot valve regulates the air on the control valve to such a pressure that said control valve just closes, no excessive pressure being placed thereon, and in the other limiting position of the regulating mechanism the pilot valve regulates the air on the control valve to such a pressure that the latter is raised to substantially the position of maximum flow, whereby movement of the regulating mechanism from either of its end positions produces a substantially immediate response in the control valve.

10. The combination as set forth in claim 7, wherein said servo-motor comprises a control valve and wherein said regulating mechanism is so constructed that in one limiting position thereof the pilot valve regulates the air on the control valve to such a pressure that the valve just moves to one of its limiting positions, no excessive pressure being exerted thereon, said limiting positions comprising the closed position and the position of maximum flow of the control valve, whereby upon movement of the regulating mechanism from its limiting position an immediate response is produced in the control valve.

11. The combination as set forth in claim 7, including means for compensating for fluctuations in the pressure of the supplied air.

12. The combination as set forth in claim 7, including means for compensating for fluctuations in the pressure of the supplied air, said means comprising an expansible member associated with said regulating mechanism to modify the adjustment of the pilot valve and communicating with the connection between the pilot valve and the servo-motor.

13. In a temperature or pressure controller, the combination of a pneumatically operated control valve, a pilot valve having an inlet for connection with a source of compressed air, a connection between said control and pilot valves, said pilot valve adapted to regulate the pressure of the air on the control valve, mechanism responsive to the temperature or pressure in the apparatus under control and including stationary high and low contacts and a movable neutral contact, and regulating mechanism associated with the pilot valve and controlled by said contact mechanism to adjust said valve to compensate for changes in the temperature or pressure in said apparatus, said regulating mechanism including a reversible motor, said contacts connected to said motor in such manner that upon engagement of one or the other of the fixed contacts by said neutral contact the motor is rotated in one or the other direction.

14. The combination as set forth in claim 13, wherein said regulating mechanism includes a cam operated by said motor and so constructed with relation to the characteristics of the control valve that when the cam is at one of its limiting positions, the pilot valve regulates the air on the control valve to such a pressure as is substantially just sufficient to bring such control valve to one of its end positions, such end positions comprising the closed position and the maximum flow position of the valve.

15. The combination as set forth in claim 13, including an expansible member communicating with the connection between the control and pilot valves and cooperating with the regulating mechanism to produce a resultant effect upon the pilot valve and thereby compensate for fluctuations in the pressure of the supplied air.

16. The combination as set forth in claim 13, wherein said regulating mechanism includes a cam driven by the motor, a compound lever comprising a first lever having one end engaging said cam, a second lever pivoted to said first lever and arranged to engage the pilot valve to adjust the same, and a capsular spring communicating with the connection between the control and pilot valves, said second lever resting on said spring, and the latter arranged to cause movement of the second lever independently of the first lever to compensate for fluctuations in the pressure of the supplied air.

17. The combination as set forth in claim 13, wherein said regulating mechanism includes a rotatable cam driven by the motor, said cam being cut spirally from one limiting position thereof to the other in such manner that for every position thereof there corresponds a definite pneumatic pressure in the control valve, the cam and control valve being so related, that at the limiting positions of the cam substantially only so much air pressure exists in the control valve as is just sufficient to close the valve or to move it to its maximum flow position, whereby no excessive pressure is imposed on the valve to close the same and no excess movement is performed by the valve when the same is opened, so that movement of the cam in either direction produces a substantially immediate response in the control valve.

18. In a temperature or pressure controller, the combination of a pneumatically operated control valve, a pilot valve associated with said control valve to govern the air pressure thereon, a temperature or pressure responsive mechanism including electric contacts, a reversible electromagnetic mechanism electrically connected with said contacts and mechanically connected with said pilot valve, said electromagnetic mechanism operable without fixed stops to limits corresponding to the maximum and minimum flow positions of the control valve, said limiting positions corresponding to large changes in the temperature or pressure in the apparatus under control.

19. The combination set forth in claim 18, including means for compensating for changes in the pressure of the air supply, said means mechanically cooperating with the means for moving the pilot valve according to changes in the temperature or pressure being controlled.

20. In a temperature or pressure controller, in combination, a temperature or pressure responsive device having electric contacts, a reversible motor associated with said contacts so as to turn in one direction as long as one contact is made, and in the other direction when another contact is made, and an air pilot valve mechanically connected with said motor to be operated thereby.

21. The combination set forth in claim 20, including a mechanical interrupter adapted to run continuously and operative to cause the motor to stop at regular intervals when its operating circuit is closed through one of said contacts, 22. In a temperature or pressure controller, the combination of a pneumatically operated control valve, a source of compressed air therefor, a pilot valve for controlling the pressure of the air in said control valve, mechanism responsive to the fluctuations in the temperature or pressure in the apparatus under control, and means for changing the position of said pilot valve and control valve when the temperature or pressure is beyond predetermined limits, the relative positions of said control valve and the responsive mechanism being independent of each other.

23. In a temperature or pressure controller, the combination of a pneumatically operated control valve adapted to be connected with a source of compressed air, a pilot valve arranged to control the pressure of the air in said control valve, temperature or pressure responsive mechanism including means determining the control limits of the temperature or pressure in the apparatus under control, and means controlled through said control limit determining means to effect a progressive reduced adustment of the pilot valve irrespective of the degree of deflection of the responsive mechanism beyond said determining means, so that the adjustment of the control valve lags the responsive mechanism and at least during the initial portion of the control operation is less than corresponds to the deflection of the responsive mechanism.

24. In combination, a pneumatically operated control valve, a source of compressed air, a pilot valve between said source and said pneumatic valve and adapted to be adjusted to different throttling positions to regulate the pressure on the control valve, means associated with the pilot valve and operating to effect adjustment of the same to throttling positions upon the basis of a definite pneumatic pressure at said source for controlling the pressure on the control valve, and means responsive to fluctuations in the pressure of the air at the controlled air pressure side of the pilot valve for compensating for such fluctuations and operating to establish on the control valve a pressure corresponding to the condition of the first-mentioned means.

25. In combination, a pneumatically operated control valve, a source of compressed air, a pilot valve between said source and said pneumatic valve and adapted to be adjusted to different throttling positions to regulate the pressure on the control valve, means associated with the pilot valve to adjust the same to throttling positions upon the basis of a definite pneumatic pressure at said source for controlling the pressure on the control valve, and means responsive to fluctuations in the pressure of the air supply and operating to re-adjust said pilot valve to compensate for such fluctuations to establish on the control valve a pressure corresponding to the condition of the first-mentioned means.

26. The combination as set forth in claim 25, wherein said first-mentioned means comprises a lever, actuating mechanism for said lever, a second lever pivoted on the first lever and arranged to adjust the pilot valve, said responsive mechanism engaging said second lever to adjust the same with respect to the first lever, thereby to adjust the pilot valve out of normal correspondence with the position of the first lever when the pressure of said air supply varies.

27. In combination, a device having electric contacts, a reversible motor associated with said contacts so as to turn in one direction as long as one contact is made, and in the other direction when another contact is made, and an air pilot valve mechanically associated with said motor to be operated thereby.

28. In a temperature or pressure controller, in combination, a temperature or pressure responsive mechanism, including a movable member and means determining control limits of the temperature or pressure in the apparatus under control, circuits associated with said control limit determining means to be set into operation thereby, a pneumatically operated control valve, a source of compressed air therefor, a pilot valve, an adjustable device for regulating the setting of the control valve, and intermediate means controlled by said responsive mechanism through said control limit determining means and said circuits for adjusting said pilot valve to change the setting of the control valve in one or the other direction in accordance with the demands of the apparatus under control, said intermediate means being movable cumulatively in one or the other direction as the movable member engages one or the other of the control limit determining means to establish a setting for the control valve corresponding with the requirements of the apparatus under control, the setting of the valve thus bearing no definite relationship to the position of the movable member of the responsive mechanism.

29. In a temperature or a pressure controller, in combination, a temperature or pressure responsive mechanism, including a movable member and means determining control limits of the temperature or pressure in the apparatus under control, circuits associated with said control limit determining means to be set into operation thereby, a pneumatically operated control valve subject to a control modulatory of that originating with the control limit determining means, a source of compressed air for said valve, a pilot valve for regulating the setting of the control valve, and intermediate control modulating mechanism responsive to the urgings of the control limit determining means as to the general direction of control to be exercised on the control valve but having independent effect on the pilot valve to determine the manner in which the control valve shall respond to the said urgings of the control limit determining means, whereby the degree of the control valve response is rendered independent of the control limit determining means and made subject to the intermediate modulating mechanism, thereby in turn subjecting the control limit determining means to the effects produced by the position of the control valve as determined by the intermediate mechanism.

30. In a temperature or a pressure controller, in combination, a temperature or pressure responsive mechanism, including a movable member and means determining control limits of the temperature or pressure in the apparatus under control, circuits associated with said control limit determining means to be set into operation thereby, a pneumatically operated control valve subject to a control modulatory of that originating with the control limit determining means, a source of compressed air for said valve, a pilot valve for regulating the setting of the control valve, and intermediate control mechanism subject to the control of the control limit determining means but constructed to cause actuation of the pilot valve according to a plan determined by its own characteristics and thus modulating the control impulse emanating from said control limit determining means and the effect of such impulse upon the setting of the control valve.

31. In a temperature controller suitable for use in thermoelectric control systems, the combination of a pneumatically operated control valve, a source of compressed air therefor, a pilot valve for controlling the pressure of the air in said control valve, electrical mechanism movable in accordance with the fluctuations in the temperature in the apparatus under control, and means controlled by said electrical mechanism for changing the position of the said pilot valve and thus of the control valve when the temperature is beyond predetermined limits, the relative positions of said control valve and the responsive mechanism being independent of each other.

32. In a temperature or pressure controller, the combination of a pneumatically operated control valve, a source of compressed air therefor, a pilot valve for controlling the pressure of the air in said control valve, mechanism responsive to the fluctuations in the temperature or pressure in the apparatus under control, a set of electric contacts arranged to be selectively operated by such mechanism when the latter is at one or the other of predetermined limits of movement, and means including electrical circuits controlled by said contacts for changing the position of said pilot valve and consequently of the control valve when the temperature or pressure rises or falls to said predetermined limits, the relative positions of said control valve and responsive mechanism being independent of each other.

LAWRENCE C. IRWIN.